United States Patent [19]

Hochheiser

[11] 3,727,105
[45] Apr. 10, 1973

[54] FAIL-SAFE POWER CUT-OUT DEVICE
[75] Inventor: Jerome S. Hochheiser, Northridge, Calif.
[73] Assignee: Anthony's Manufacturing Company, Inc., San Fernando, Calif.
[22] Filed: June 24, 1971
[21] Appl. No.: 156,405

Related U.S. Application Data
[63] Continuation-in-part of Ser. No. 48,887, June 15, 1970, abandoned.

[52] U.S. Cl. .............. 317/16, 317/33 SC, 317/40 A, 219/507, 219/517, 324/51
[51] Int. Cl. ............................................ H02h 3/00
[58] Field of Search .................. 317/16, 33 SC, 40 A, 317/18 B; 307/94, 100; 340/253 B, 256; 324/51; 219/507, 517, 509, 203

[56] References Cited
UNITED STATES PATENTS
3,512,044   5/1970   Jones ....................... 317/16
3,566,198   2/1971   Delahunty .................. 317/33 SC FOREIGN PATENTS OR APPLICATIONS
249,819   2/1966   Germany ........................ 219/509

Primary Examiner—Miller J. D.
Assistant Examiner—Harvey Fendelman
Attorney—Richard Morganstern et al.

[57] ABSTRACT

A circuit is disclosed in which one or more power line fuses are automatically blown in the event of an open circuit or other interruption in the power circuit so as to prevent electric shock to anyone coming in contact with the damaged equipment. The circuit employs a current valve such as a silicon controlled rectifier (SCR) normally held in a cut-off mode. The valve is rapidly actuated in the event of equipment damage to effectively short circuit the line and blow the fuses.

15 Claims, 3 Drawing Figures

PATENTED APR 10 1973
3,727,105
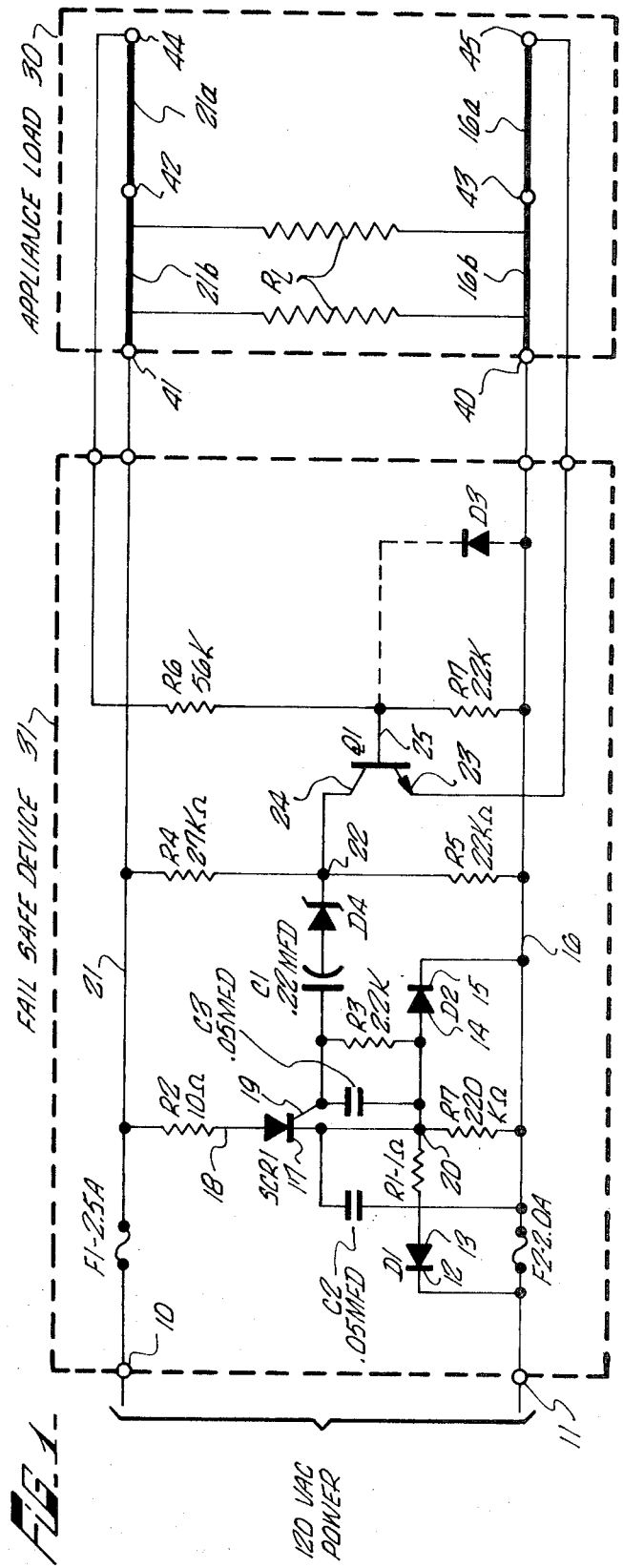
Fig. 1.
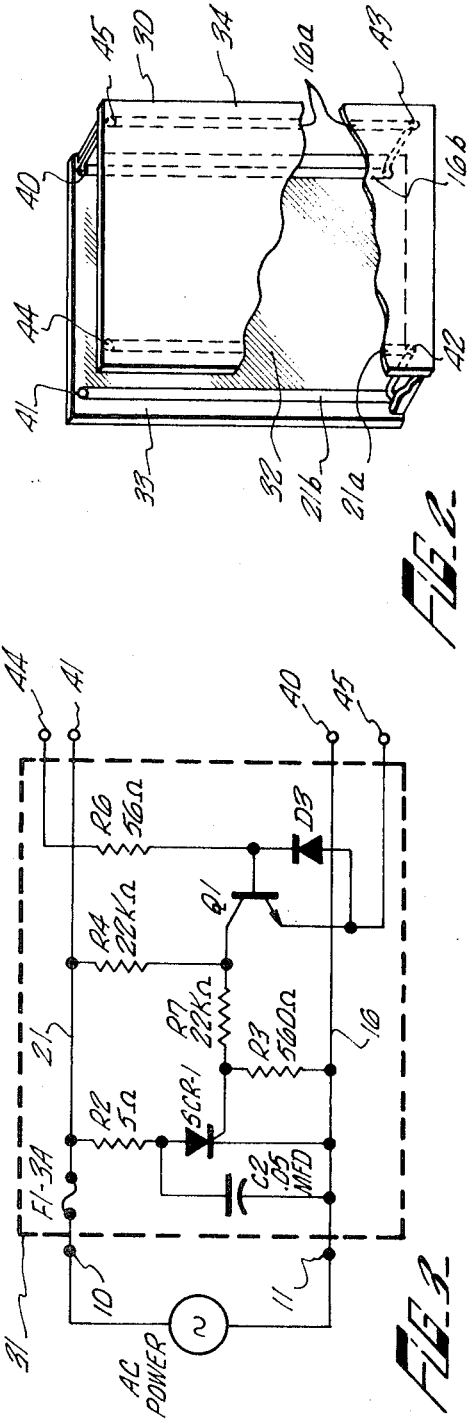
Fig. 2.
Fig. 3.
INVENTOR.
JEROME S. HOCHHEISER
BY
Dolove, Steinberg & Morganstern
ATTORNEYS.

3,727,105

FAIL-SAFE POWER CUT-OUT DEVICE

This is a continuation-in-part of application Ser. No. 48,887, filed June 15, 1970 now abandoned.

BACKGROUND OF THE INVENTION

In low temperature see-through cabinets used in supermarkets to display and store frozen foods, ice cream, etc., the multipane glass units used in the refrigerated cabinet doors tend to frost if not appropriately heated. Frosting of the door glass destroys a cabinet's utility as a display medium for the refrigerated products.

To eliminate frost formation at least one glass pane is typically coated with a transparent conductive coating. Electrical power is applied to the coating to generate heat.

In the event of breakage of the glass door unit, as by someone accidentally banging into the cabinet door, the electric power leads to the conductive coating and the coating itself becomes exposed. The likelihood of the consumer, and/or the consumer's metal shopping cart coming in contact with the open but live power circuit is great. Such an eventuality would result in at least a serious shock. In the prior art, typically a short in the power circuit has been the only event which would result in removing power from the circuit as by circuit breakers or fusible links.

A rapidly operable means is therefore necessary to remove power from all parts of a door or other utilization apparatus should an accidental break (open circuit) in the system occur (or power fail on the load side of the device). It is just such a means that is contemplated by this invention.

THE PRESENT INVENTION

Means has been devised to rapidly deliberately overload both sides of a two-wire power line upon the occurrence of a break in the power circuit and thus blow fuses or other protection devices in each of the wires of the line.

The circuit arrangement of the means to accomplish the over-load incorporates a novel combination of a control circuit which is responsive to a break in the power circuit to actuate a current valve. The current valve is normally held in a non-conductive mode by the control circuit.

The control circuit is adapted to place the current valve in a high conduction mode responsive to sensing a break in the appliance power circuit. The high conduction mode current first activates one of the in-line fuses (or other protection device).

A current steering circuit is also provided. After the first in-line fuse is blown, the steering circuit steers the high valve current past the first blown fuse until the other in-line fuse is blown. This removes any chance of power remaining at any point where exposed wires, leads or other circuit components are located.

In an alternate embodiment the current steering circuit is not required and the control circuit and current valve function to operate a protection device in only one side of a power line. This embodiment finds particular utility where the other side of the power line can be adequately grounded.

While hereinafter specifically discussed with respect to electrically heated glass assemblies in low temperature cabinet doors, there are many other areas of use for the safety device of this invention. It will find use in any area where a failure mode in an electric current carrying circuit could lead to a live circuit, or parts thereof, coming in contact with personnel. In such a situation the immediate removal of power from the circuit is a necessary safety measure for the protection of such personnel.

Accordingly, it is an object of this invention to provide a protection system which rapidly removes electrical power from an apparatus in response to any failure of current in the apparatus power circuit due to a break therein.

It is a further object of the invention that the circuit thereof provide for the removal of power from both sides of a two-wire power line in the event of a break in the line from any cause.

These and other objects of the invention will become more apparent from the detailed specification which follows having reference to the accompanying figures in which preferred embodiments are shown and described. The disclosure herein should not be construed as limited to the embodiment described since those skilled in the arts appertaining to the invention will be able to devise other embodiments in the light of the teachings herein.

IN THE FIGURES

FIG. 1 is a schematic circuit diagram of a safety device constructed in accordance with the principles of this invention showing, also schematically, a typical load device to which the safety device finds utility;

FIG. 2 is a partially broken drawing of a type of heated glass sandwich with which the invention may be used; and FIG. 3 is a schematic circuit diagram of an alternate embodiment of the safety device of the present invention wherein one side of the power leads is disconnected from the utilization apparatus following a failure in the power circuit.

As has been briefly described hereinabove the power cut-out system of this invention functions to rapidly remove power upon the occurrence of a break in the power circuit so as to prevent exposed or broken portions of the power circuit from creating a shock hazard.

An important aspect of the operation of the circuit of this invention lies in the fact that a current valve such as a silicon controlled rectifier (SCR) and a diode rectifier can carry surge currents many times the nominal rated operating current carrying capacity of such devices.

The circuit of this invention provides means whereby an SCR is held in an off (untriggered) state until a voltage sensing element detects a break in the line (an open circuit)—or applied power.

The schematic circuit diagram of FIG. 1 shows an exemplary embodiment of a device constructed in accordance with the principles of the present invention. Circuit values shown on the components of the diagram are typical of those used in a practical embodiment of the invention wherein 3 amp and 4 amp fuses for handling 240 watts at 120 volts a.c. power were employed. Other circuit values can be employed for other voltage and power requirements.

Referring now to FIG. 1, electric power is applied to the circuit at input terminals 10 and 11. A first fuse F1 shown as a 4A fuse is in one side of the power line 21 while a second fuse F2 shown as a 3A fuse is in the other side of the power line 16.

Connected across fuse F2 are a diode D1 in series with a resistor R1 and a diode D2. Diode D1 is poled so that its cathode 12 is connected to line 16 and its anode 13 connected to one side of resistor R1. The other side of resistor R1 is connected to the anode 14 of diode D2. The cathode 15 of diode D2 is connected to the other side 16 of fuse F2 which may be considered the "return" side of the power line. The cathode 17 of an SCR identified as SCR-1 is connected to the junction 20 of diode D2 and resistor R1. The anode 18 of SCR-1 is connected to one side of the a.c. line shown at 21 on the circuit side of fuse F1, through a current limiting resistor R2. From the gate electrode 19 a resistor R3 is connected to the junction 20.

Resistors R4 and R5 are connected in series across power line leads 21 and 16 to form a voltage divider. From the junction 22 between resistors R4 and R5 a capacitor C1 is connected to the gate electrode 19 of SCR-1. Also connected to junction 22 is the collector 24 of a transistor Q1. The emitter 23 of transistor Q1 is connected to the return side of an appliance load 30. Appliance load 30 is shown within a dashed line enclosure which includes load resistance elements $R_L$. The base 25 of transistor Q1 is connected to the junction of resistors R6 and R7. A diode D3 may be substituted in place of resistor R7 for improved operation of the circuit. The anode of D3 goes to the emitter 23 and the cathode of D3 goes to base 25 of Q1. The other side of R6 is connected to one side 21a, of the load 30. The other side of resistor R7 is connected to a.c. line return 16.

In the embodiment described elements $R_L$ represent a glass panel having a conductive-resistive coating thereon. A multipane glass unit incorporating such a glass panel is shown in a partially cut-away view in FIG. 2. The load element $R_L$ has one bus bar 21b and a return bus bar 16b. It can be seen that the bus bar leads are connected to the lines 21 and 16 of the fail safe device 31 of the invention.

Referring now in greater detail to FIG. 2, a typical multipane glass unit of the type used in refrigerated cabinet doors is shown. Bus bars 21b, 16b are preferably in the form of conductive strips. A transparent conductive-resistive film 32 is positioned on the inner surface of pane 33 so that when power is applied to strip leads 21b, 16b the film (a resistive material) generates heat preventing the formation of frost on the glass panes.

Normally the conductive-resistive film is positioned on only one of the panes. The conductive bus bars may, however, also be positioned on the non-conductively coated pane 34. Bus bar portions 21a and 21b are shown so positioned in FIG. 2. With this configuration (although it is not required) the safety device of the present invention will, in a manner to be hereinafter described, remove power from the glass unit when either pane is damaged.

While the glass panes 33, 34 forming the multipane unit normally insulate the resistive film 32 and bus bars 21a, b and 16a, b, from the exterior of the unit, should such a unit break, the bus bars and the conductive film would be exposed. In normal electrical systems an open circuit, as would be created by such a breakage, does not result in the actuation of fusing or circuit breaking devices. The exposed electrical components would thus present a serious hazard. When used with the fail safe device 31 of the present invention, however, the following operation results.

As long as the circuit is intact transistor Q1 receives a base drive current via resistor R6 from the line 21 a, b in load device 30. Power is applied to load device 30 from the a.c. line terminals 10, 11 via fuses F1 and F2 and lines 16, 21. The conductive load element 30 is connected to leads 16, 21 at terminals 40, 41.

With the Q1 circuit complete via emitter 23 to point 45 on the conductive load 30, and the base drive via R6 present, the Q1 collector 24 receives current from line 21 via load resistor R4. Transistor Q1 is thus rendered conductive. Junction 22 is thus at a very low potential with respect to line 16, (essentially a short circuit). Thus, SCR-1 is not provided with gate potential and is rendered non-conductive.

Any break occurring in the paths between 41 and 44 (or 40 and 45) or across $R_L$ (as by a break in one of the glass panes) will remove bias, or drive current, from Q1. This results in transistor Q1 being placed in a non-conductive condition. This removes the effective short across R5, thus raising the voltage at junction 22 and at the gate electrode of SCR-1. SCR-1 is triggered into its high conduction mode. This applies an overload to fuse F2 through diode D2. Fuse F2 blows first since it is of a lower current carrying capacity than Fuse F1. After fuse F2 opens, current flows through diode D1. An overload occurs through fuse F1 to blow it. Fuse F1 blowing completes the open circuit condition in both lines 16, and 21. Resistor R1 insures that the initial overload current will flow through diode D2 and fuse F2 first. D1, D2, R1 thus can be described as a current steering circuit. After fuse F2 is opened by the overload through diode D2, then Fuse F1 responds to the overload through diode D1 and SCR-1.

The above described sequence occurs rapidly typically within a period of time represented by the normal fusing time of the fusible links F2, F1. This in practice is typically less than one-tenth of a second.

Thus, should a break occur due to breakage of either of the glass panels within about a tenth of a second or less the fuses F1 and F2 will open, preventing power from appearing anywhere in the area of the glass panel. This effectively eliminates shock hazard to anyone coming in contact with the broken panel or associated equipment.

Referring now to FIG. 3 an alternate embodiment to the safety device of the present invention is shown. The embodiment of FIG. 3 is adapted to actuated a power cut-out device located in only one of the power lines (line 21 in FIG. 3). This configuration is adequate when grounding or other isolation of line 16 is feasible.

The operation of the embodiment of FIG. 3 is similar to that of FIG. 1 and need not therefore be described in detail. The diode steering network of FIG. 1 is not required since only one fusable link is involved. Further, it has been found that circuit transient protection components (such as components C1, C3, R7 FIG. 1) may be eliminated in the simplified single fuse configuration of FIG. 3.

The protection devices of the present invention thus enable rapid disconnection of selectively either one or both sides of a power line from a utilization device upon the occurrence of a potentially dangerous malfunction of or damage to the device.

I claim:

1. A protection device for a two-wire electrical power line connected to a load, said device comprising:
   current valve means having input, output and control terminals, said input and output terminals being operatively connected across said two-wire power line, said valve means having a high-current conduction condition when a control signal of a first kind is applied to said control terminal and a low-current conduction condition when a control signal of a second kind is applied to said control terminal;
   a pair of fuses one each operatively connected in each wire of said power line between said valve means and the source of power for said line;
   means for normally supplying control signals of said second kind to said control terminal and for supplying signals of said first kind to said control terminal responsive to the occurrence of an open circuit in said load; and
   steering circuit means for directing the high valve means current through one of said fuses to open circuit said one fuse and for thereafter providing a bypass current path bypassing said open circuited fuse to allow said high current to open circuit the other of said fuses, whereby each side of said power line will be rapidly disconnected from the source of power for said line subsequent to an open circuit appearing in said load.

2. The protection device of claim 1 wherein said steering circuit means comprises:
   a pair of oppositely poled diode circuits receiving said high valve means current, one of said diode circuits first directing said high current through said one fuse to open circuit said fuse, the other of said diode circuits thereafter directing said high current past said one fuse to the source of power whereby the other of said fuses will thereafter open circuit.

3. The protection device of claim 2 wherein said one fuse has a lower open circuiting current rating than the other of said fuses.

4. The protection device of claim 3 wherein said valve means comprises:
   a silicon controlled rectifier having anode, cathode and gate terminals, the silicon controlled rectifier anode-cathode circuit being operatively connected between one of said line wires and said diode steering circuit.

5. The protection device of claim 4 wherein said control signal supplying means comprises:
   a transistor circuit including means connected thereto and to said power line to maintain the transistor normally conductive and to render the transistor nonconductive responsive to an open circuit in the load device, said transistor circuit being operatively connected to the gate electrode of said silicon controlled rectifier to apply thereto signals of said second kind when conductive and of said first kind when nonconductive.

6. The protection device of claim 5 wherein said load comprises a conductive coating positioned on a frangible substrate whereby said load will be open circuited responsive to damage to the substrate.

7. The protection device of claim 6 wherein said frangible substrate is a glass panel having a conductive coating thereon.

8. A protection device for connection in power lines connected to a load device, said protection device comprising:
   a normally nonconductive current valve connected across said power lines, said current valve being highly conductive in response to the application of predetermined control signals;
   line opening means connected in each leg of said power lines between the source of power for said lines and said control circuit;
   means for supplying said predetermined control signals to said current valve in response to an open circuit condition in said load device; and
   steering circuit means for directing said resulting current valve current through one of said line opening means to open one of said lines and for thereafter providing a bypass current path bypassing said one line opening means to allow said resulting current valve current to activate the other line opening means to open the other of said lines, whereby each side of said power lines will be rapidly disconnected from the source of power for the lines subsequent to an open circuit appearing in said load.

9. The protection device of claim 8 wherein said line opening means comprises fuses, one each connected in each leg of said power lines.

10. The protection device of claim 9 wherein said steering circuit means comprises:
    a pair of oppositely poled diode circuits receiving said control circuit current, one of said diode circuits first directing the control circuit current through one fuse, the other of said diode circuits thereafter directing said control circuit current past said one fuse to the source of power whereby the other of said fuses will thereafter be open circuited.

11. Protection apparatus for isolating a power line connectable to a source of potential from a utilization device, the apparatus being operable in response to a malfunction in the utilization device, said apparatus comprising:
    current valve means having input, output and control terminals, said input and output terminals being operatively connected across said power line, said valve means having a high current conduction condition when a control signal of a first kind is applied to said control terminal and a low-current conduction condition when a control signal of a second kind is applied to said control terminal;
    line opening means connected in one leg of said power line between said valve means and the source of potential for opening said power line leg responsive to the presence of a high current; and
    means for normally applying a control signal of said second kind to said control terminal and for applying a control signal of said first kind to said control terminal responsive to the occurrence of an open circuit in said load, whereby said current valve will be placed in a high current conduction condition to actuate said line opening means.

12. The apparatus of claim 11 wherein the power line has a second leg adapted to be connected to ground.

13. The apparatus of claim 12 wherein said line opening means is a fuse.

14. The apparatus of claim 12 wherein said control signal applying means comprises a transistor having base, collector and emitter terminals, and a base bias circuit said base bias circuit being in series electrical configuration with said utilization device, said transistor collector-emitter circuit being operatively connected between the control terminal of said current valve means and ground, whereby said control terminal is kept at a potential close to ground potential when current flows in the transistor base bias circuit.

15. The apparatus of claim 14 wherein said load comprises a conductive coating positioned on a frangible substrate, said substrate having a pair of spaced conductive bus bars positioned thereon, said bus bars being connected to said power line, whereby upon fracture of said substrate power will be removed from the coating.

* * * * *